US011948192B2

(12) United States Patent
Dalleggio et al.

(10) Patent No.: US 11,948,192 B2
(45) Date of Patent: Apr. 2, 2024

(54) METHOD AND SYSTEM FOR PROVIDING HIGH-SPEED STORAGE AND RETRIEVAL OF INFORMATION

(71) Applicant: JPMorgan Chase Bank, N.A., New York, NY (US)

(72) Inventors: Anthony Dalleggio, Holmdel, NJ (US); Mohan Reemala, Hillsborough, NJ (US); Mikhail Kraizman, Morganville, NJ (US); Alex Vrahimis, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 130 days.

(21) Appl. No.: 17/650,413

(22) Filed: Feb. 9, 2022

(65) Prior Publication Data

US 2023/0306506 A1  Sep. 28, 2023

(51) Int. Cl.
*G06F 16/00* (2019.01)
*G06Q 40/04* (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | | |
|---|---|---|---|
| 2008/0120129 A1 | 5/2008 | Seubert et al. | |
| 2009/0089220 A1* | 4/2009 | Ciabattoni | G06Q 40/04 705/36 R |
| 2009/0150169 A1* | 6/2009 | Kirkwood | G06Q 40/00 705/342 |
| 2011/0184844 A1 | 7/2011 | Parsons et al. | |
| 2012/0089497 A1 | 4/2012 | Taylor et al. | |
| 2015/0256522 A1* | 9/2015 | Jeffrey | H04L 9/3271 713/168 |
| 2016/0182588 A1* | 6/2016 | Luo | G06F 16/24568 709/219 |

(Continued)

OTHER PUBLICATIONS

International Search Report and Written Opinion issued in International Patent Application No. PCT/US2022/15750, dated May 24, 2022.

*Primary Examiner* — Hasanul Mobin
(74) *Attorney, Agent, or Firm* — Greenblum & Bernstein, P.L.C.

(57) ABSTRACT

A method for providing high-speed storage and retrieval of information from a plurality of sources is disclosed. The method includes retrieving data from the sources; identifying a deterministic perfect hash function based on the retrieved data for stock symbols and corresponding stock information, the perfect hash function relating to a mapping of distinct elements in the corresponding stock information with the stock symbols; generating, by using the retrieved data, a parameter that relates to an instruction to calculate the identified perfect hash function, the parameter including a host file, a simulation file, and a hash state file; programming a register and a memory that are associated with the processor by using the parameter; and determining, via the programmed register and the programmed memory, a hash value for incoming stock symbols, the hash value relating to a symbol index that locates information corresponding to the incoming stock symbols.

18 Claims, 7 Drawing Sheets

(56) References Cited

U.S. PATENT DOCUMENTS

2016/0337252 A1*  11/2016  Eberle ................. H04L 49/9031
2020/0311723 A1*  10/2020  Miller .................... G06Q 40/04
2020/0396065 A1*  12/2020  Gutierrez-Sheris ..... H04L 63/12
2022/0015750 A1*   1/2022  Yardibi .................. A61B 34/30
2023/0306506 A1*   9/2023  Dalleggio .............. G06Q 40/04
                                                              705/37

* cited by examiner

METHOD AND SYSTEM FOR PROVIDING HIGH-SPEED STORAGE AND RETRIEVAL OF INFORMATION

BACKGROUND

1. Field of the Disclosure

This technology generally relates to methods and systems for information storage and retrieval, and more particularly to methods and systems for providing high-speed storage, retrieval, and intraday updates of stock-related information for multiple exchanges.

2. Background Information

Financial institutions utilize ultra-low latency trading systems to facilitate transactions of financial instruments such as, for example, stocks. Often, these ultra-low latency trading systems need to store and retrieve information relating to the financial instruments at very high speeds. Historically, implementation of conventional data management techniques has resulted in varying degrees of success with respect to fast storage and retrieval of information, efficient mapping of multiple symbol representations to a financial instrument, as well as effective intraday updates with minimal impact.

One drawback of conventional data management techniques is that in many instances, storage and retrieval of data from a data storage component such as, for example, a data table rely on inefficient database indexes. As a result, ultra-low latency data storage and retrieval may not be possible. Additionally, the financial instruments may be represented differently from one financial exchange to another and may require frequent intraday updates, which further increase latency and cause disruptions to trading.

Therefore, there is a need to providing high-speed storage, retrieval, and intraday updates of stock-related information for multiple exchanges by using an ultra-fast and deterministic perfect hash function.

SUMMARY

The present disclosure, through one or more of its various aspects, embodiments, and/or specific features or sub-components, provides, inter alia, various systems, servers, devices, methods, media, programs, and platforms for providing high-speed storage, retrieval, and intraday updates of stock-related information for multiple exchanges.

According to an aspect of the present disclosure, a method for providing high-speed storage and retrieval of information from a plurality of sources is disclosed. The method is implemented by at least one processor. The method may include retrieving data from each of the plurality of sources, the data may include at least one from among a symbol file list and a symbol file; identifying a perfect hash function based on the retrieved data for a plurality of stock symbols and corresponding stock information, the perfect hash function may include a deterministic hash function that relates to a mapping of distinct elements in the corresponding stock information with the plurality of stock symbols; generating, by using the retrieved data, at least one parameter that relates to at least one instruction to calculate the identified perfect hash function, the at least one parameter may include at least one from among a host file, a simulation file, and a hash state file; programming at least one register and at least one memory that are associated with the at least one processor by using the at least one parameter; and determining, via the programmed at least one register and the programmed at least one memory, at least one hash value for each of a plurality of incoming stock symbols, the at least one hash value may relate to a symbol index that locates information corresponding to each of the plurality of incoming stock symbols.

In accordance with an exemplary embodiment, the at least one symbol file list may include at least one file name and at least one associated characteristic that corresponds to each of the plurality of stock symbols, each of the plurality of stock symbol s may relate to an abbreviation that is used to identify publicly traded shares of a stock on each of the corresponding plurality of sources.

In accordance with an exemplary embodiment, the at least one symbol file may include at least one from among mapping information and listing information that corresponds to each of the plurality of stock symbols.

In accordance with an exemplary embodiment, the perfect hash function may be identified for the plurality of stock symbols based on a selection of a hash function from a plurality of hash functions.

In accordance with an exemplary embodiment, to generate the at least one parameter, the method may further include generating, by using the retrieved data, the host file, the host file may include at least one data pair that facilitates automated programming of the at least one register and the at least one memory; generating, by using the retrieved data, the simulation file, the simulation file may relate to instructions to preconfigure the at least one register and the at least one memory; and generating, by using the retrieved data, the hash state file, the hash state file may include at least one previously calculated parameter for the plurality of stock symbols.

In accordance with an exemplary embodiment, the host file may include at least one from among a host register file and a host direct memory access file, the host register file may include a register name together with a corresponding data pair, and the host direct memory access file may include an address together with the corresponding data pair.

In accordance with an exemplary embodiment, the method may further include identifying, by using the perfect hash function, a validation hash value for each of the plurality of stock symbols based on the at least one hash state file; determining, based on the validation hash value, whether a collision exists between the plurality of stock symbols; and verifying the perfect hash function based on a result of the determining.

In accordance with an exemplary embodiment, to program the at least one register and the at least one memory, the method may further include implementing an active hashing bank and an inactive hashing bank, the active hashing bank may include a read only permission, and the inactive bank may include read and write permissions.

In accordance with an exemplary embodiment, the method may further include initiating an intraday update on the inactive hashing bank, the intraday update may relate to an adjustment of a hash coefficient and a corresponding mapping value; and switching, via double buffering, the inactive hashing bank with the active hashing bank.

According to an aspect of the present disclosure, a computing device configured to implement an execution of a method for providing high-speed storage and retrieval of information from a plurality of sources is disclosed. The computing device including a processor; a memory; and a communication interface coupled to each of the processor and the memory, wherein the processor may be configured to retrieve data from each of the plurality of sources, the data may include at least one from among symbol file list and a symbol file; identify a perfect hash function based on the retrieved data for a plurality of stock symbols and corresponding stock information, the perfect hash function may include a deterministic hash function that relates to a mapping of distinct elements in the corresponding stock information with the plurality of stock symbols; generate, by using the retrieved data, at least one parameter that relates to at least one instruction to calculate the identified perfect hash function, the at least one parameter may include at least one from among a host file, a simulation file, and a hash state file; program at least one register and at least one memory that are associated with the processor by using the at least one parameter; and determine, via the programmed at least one register and the programmed at least one memory, at least one hash value for each of a plurality of incoming stock symbols, the at least one hash value may relate to a symbol index that locates information corresponding to each of the plurality of incoming stock symbols In accordance with an exemplary embodiment, the at least one symbol file list may include at least one file name and at least one associated characteristic that corresponds to each of the plurality of stock symbols, each of the plurality of stock symbols may relate to an abbreviation that is used to identify publicly traded shares of a stock on each of the corresponding plurality of sources.

In accordance with an exemplary embodiment, the at least one symbol file may include at least one from among mapping information and listing information that corresponds to each of the plurality of stock symbols.

In accordance with an exemplary embodiment, the processor may be further configured to identify the perfect hash function for the plurality of stock symbols based on a selection of a hash function from a plurality of hash functions.

In accordance with an exemplary embodiment, to generate the at least one parameter, the processor may be further configured to generate, by using the retrieved data, the host file, the host file may include at least one data pair that facilitates automated programming of the at least one register and the at least one memory; generate, by using the retrieved data, the simulation file, the simulation file may relate to instructions to preconfigure the at least one register and the at least one memory; and generate, by using the retrieved data, the hash state file, the hash state file may include at least one previously calculated parameter for the plurality of stock symbols.

In accordance with an exemplary embodiment, the host file may include at least one from among a host register file and a host direct memory access file, the host register file may include a register name together with a corresponding data pair, and the host direct memory access file may include an address together with the corresponding data pair.

In accordance with an exemplary embodiment, the processor may be further configured to identify, by using the perfect hash function, a validation hash value for each of the plurality of stock symbols based on the at least one hash state file; determine, based on the validation hash value, whether a collision exists between the plurality of stock symbols; and verify the perfect hash function based on a result of the determining.

In accordance with an exemplary embodiment, to program the at least one register and the at least one memory, the processor may be further configured to implement an active hashing bank and an inactive hashing bank, the active hashing bank may include a read only permission, and the inactive bank may include read and write permissions.

In accordance with an exemplary embodiment, the processor may be further configured to initiate an intraday update on the inactive hashing bank, the intraday update may relate to an adjustment of a hash coefficient and a corresponding mapping value; and switch, via double buffering, the inactive hashing bank with the active hashing bank.

According to an aspect of the present disclosure, a non-transitory computer readable storage medium storing instructions for providing high-speed storage and retrieval of information from a plurality of sources is disclosed. The storage medium including executable code which, when executed by a processor, may cause the processor to retrieve data from each of the plurality of sources, the data may include at least one from among a symbol file list and a symbol file; identify a perfect hash function based on the retrieved data for a plurality of stock symbols and corresponding stock information, the perfect hash function may include a deterministic hash function that relates to a mapping of distinct elements in the corresponding stock information with the plurality of stock symbols; generate, by using the retrieved data, at least one parameter that relates to at least one instruction to calculate the identified perfect hash function, the at least one parameter may include at least one from among a host file, a simulation file, and a hash state file; program at least one register and at least one memory that are associated with the processor by using the at least one parameter; and determine, via the programmed at least one register and the programmed at least one memory, at least one hash value for each of a plurality of incoming stock symbols, the at least one hash value may relate to a symbol index that locates information corresponding to each of the plurality of incoming stock symbols.

In accordance with an exemplary embodiment, when executed by the processor, may further cause the processor to identify the perfect hash function for the plurality of stock symbols based on a selection of a hash function from a plurality of hash functions.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
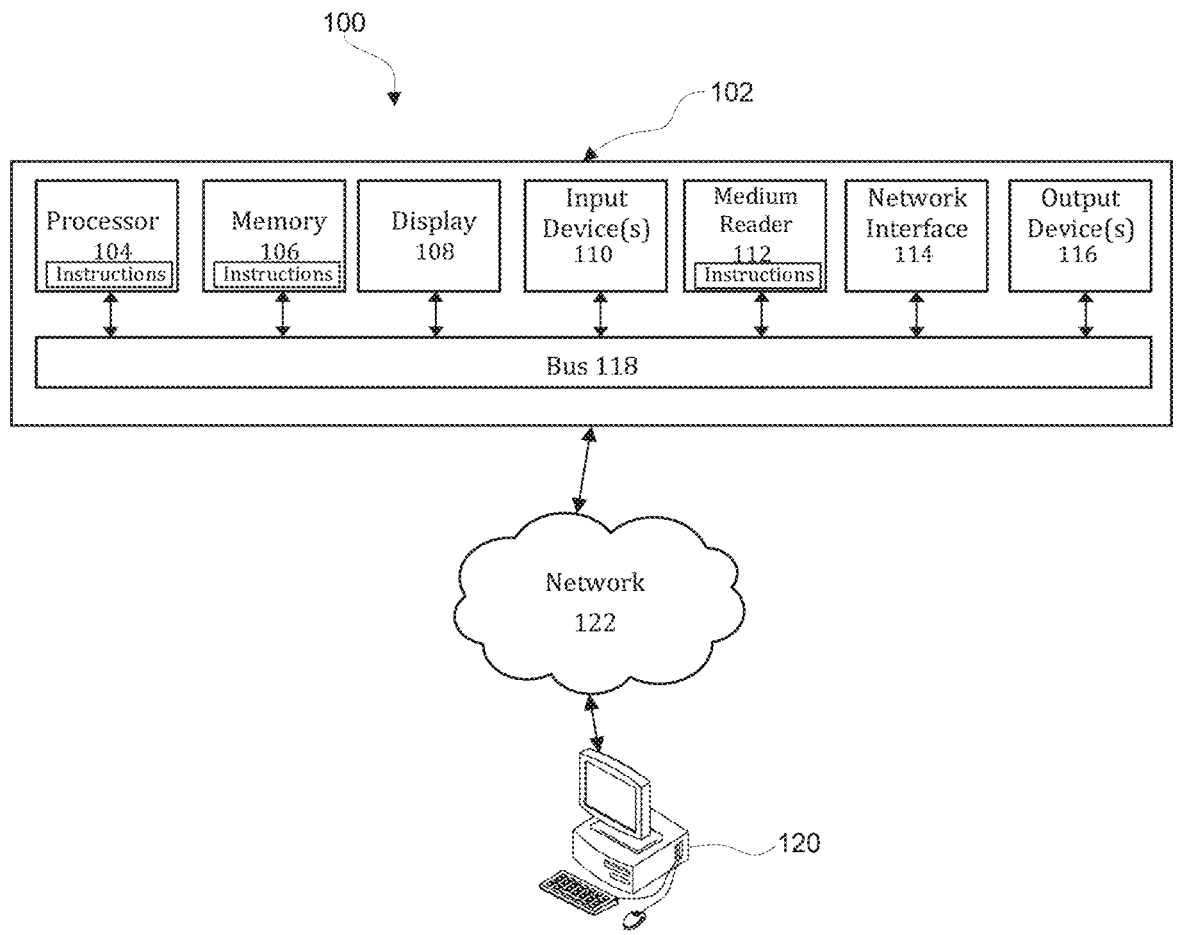
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field-programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing high-speed storage, retrieval, and intraday updates of stock-related information for multiple exchanges.

Figure 2:
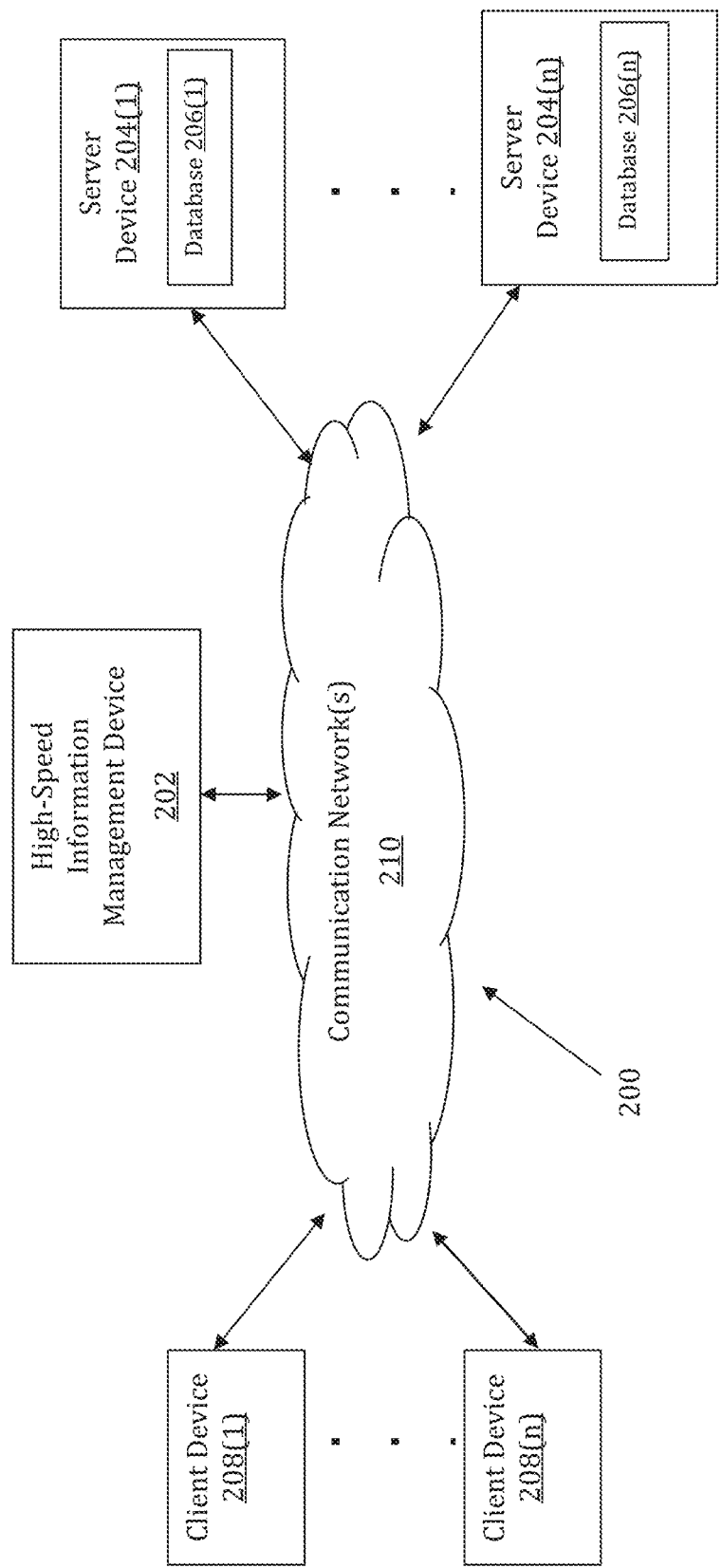
FIG. 2 illustrates an exemplary diagram of a network environment.

Referring to FIG. 2, a schematic of an exemplary network environment 200 for implementing a method for providing high-speed storage, retrieval, and intraday updates of stock-related information for multiple exchanges is illustrated. In an exemplary embodiment, the method is executable on any networked computer platform, such as, for example, a personal computer (PC).

The method for providing high-speed storage, retrieval, and intraday updates of stock-related information for multiple exchanges may be implemented by a High-Speed Information Management (HSIM) device 202. The HSIM device 202 may be the same or similar to the computer system 102 as described with respect to FIG. 1. The HSIM device 202 may store one or more applications that can include executable instructions that, when executed by the HSIM device 202, cause the HSIM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HSIM device 202 itself, may be located in virtual server(s) running in a cloud-based computing environment rather than being tied to one or more specific physical network computing devices. Also, the application(s) may be running in one or more virtual machines (VMs) executing on the HSIM device 202. Additionally, in one or more embodiments of this technology, virtual machine(s) running on the HSIM device 202 may be managed or supervised by a hypervisor.

In the network environment 200 of FIG. 2, the HSIM device 202 is coupled to a plurality of server devices 204(1)-204(n) that hosts a plurality of databases 206(1)-206(n), and also to a plurality of client devices 208(1)-208(n) via communication network(s) 210. A communication interface of the HSIM device 202, such as the network interface 114 of the computer system 102 of FIG. 1, operatively couples and communicates between the HSIM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HSIM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and HSIM devices that efficiently implement a method for providing high-speed storage, retrieval, and intraday updates of stock-related information for multiple exchanges.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HSIM device 202 may be a standalone device or integrated with one or more other devices or apparatuses, such as one or more of the server devices 204(1)-204(n), for example. In one particular example, the HSIM device 202 may include or be hosted by one of the server devices 204(1)-204(n), and other arrangements are also possible. Moreover, one or more of the devices of the HSIM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the HSIM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to stock symbols, stock information, exchange data, symbol file lists, symbol files, perfect hash functions, parameters, host files, simulation files, hash state files, and hash values.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the HSIM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the HSIM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the HSIM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HSIM device 202, the server devices 204(1)-204(n), or the client devices 208(1)-208(n), for example, may be configured to operate as virtual instances on the same physical machine. In other words, one or more of the HSIM device 202, the server devices 204(1)-204(n), or the client devices 208(1)-208(n) may operate on the same physical device rather than as separate devices communicating through communication network(s) 210. Additionally, there may be more or fewer HSIM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
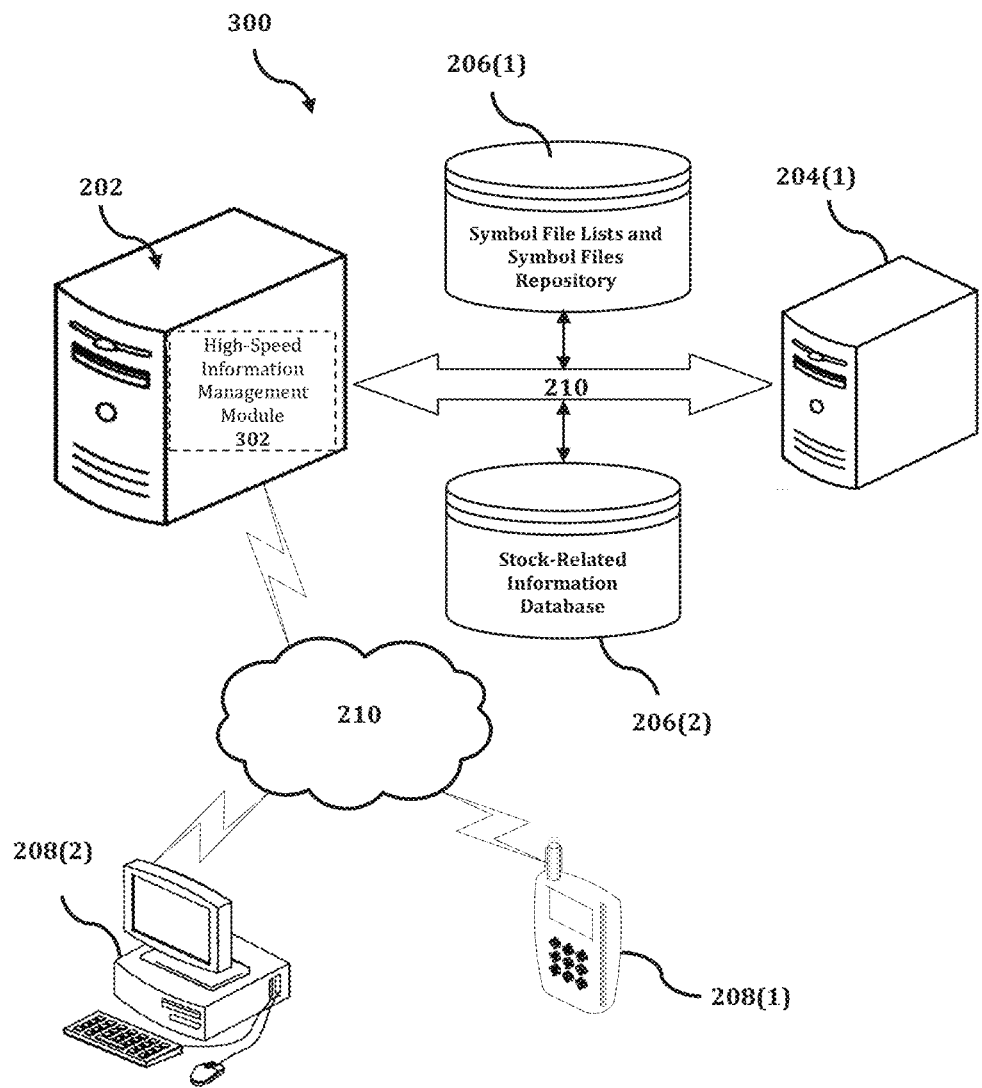
FIG. 3 shows an exemplary system for implementing a method for providing high-speed storage, retrieval, and intraday updates of stock-related information for multiple exchanges.

The HSIM device 202 is described and shown in FIG. 3 as including a high-speed information management module 302, although it may include other rules, policies, modules, databases, or applications, for example. As will be described below, the high-speed information management module 302 is configured to implement a method for providing high-speed storage, retrieval, and intraday updates of stock-related information for multiple exchanges.

An exemplary process 300 for implementing a mechanism for providing high-speed storage, retrieval, and intraday updates of stock-related information for multiple exchanges by utilizing the network environment of FIG. 2 is shown as being executed in FIG. 3. Specifically, a first client device 208(1) and a second client device 208(2) are illustrated as being in communication with HSIM device 202. In this regard, the first client device 208(1) and the second client device 208(2) may be "clients" of the HSIM device 202 and are described herein as such. Nevertheless, it is to be known and understood that the first client device 208(1) and/or the second client device 208(2) need not necessarily be "clients" of the HSIM device 202, or any entity described in association therewith herein. Any additional or alternative relationship may exist between either or both of the first client device 208(1) and the second client device 208(2) and the HSIM device 202, or no relationship may exist.

Further, HSIM device 202 is illustrated as being able to access a symbol file lists and symbol files repository 206(1) and a stock-related information database 206(2). The high-speed information management module 302 may be configured to access these databases for implementing a method for providing high-speed storage, retrieval, and intraday updates of stock-related information for multiple exchanges.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the HSIM device 202 via broadband or cellular communication. Of course, these embodiments are merely exemplary and are not limiting or exhaustive.

Upon being started, the high-speed information management module 302 executes a process for providing high-speed storage, retrieval, and intraday updates of stock-related information for multiple exchanges. An exemplary process for providing high-speed storage, retrieval, and intraday updates of stock-related information for multiple exchanges is generally indicated at flowchart 400 in FIG. 4.

Figure 4:
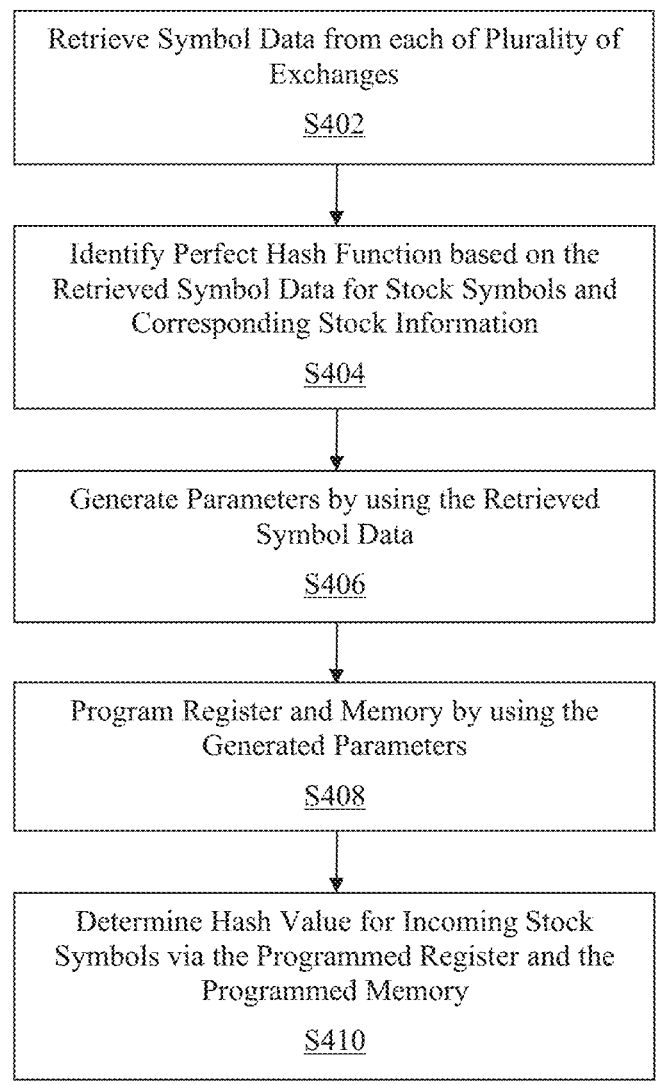
FIG. 4 is a flowchart of an exemplary process for implementing a method for providing high-speed storage, retrieval, and intraday updates of stock-related information for multiple exchanges.

In the process 400 of FIG. 4, at step S402, data may be retrieved from a plurality of sources. The data may include a symbol file list and a symbol file. In an exemplary embodiment, the plurality of sources may include at least one from among a financial exchange platform and a service that provides market data. For example, the financial exchange platform may include a stock exchange such as the New York Stock Exchange and the market data service may include a service that aggregates market data. In another exemplary embodiment, the data may include information that relates to a plurality of stock symbols and corresponding stock information. The corresponding stock information may include information such as, for example, price information, trading halts information, last traded price information, and easy-to-borrow indication information that corresponds to a stock symbol. In another exemplary embodiment, the data may include information that relates to any financial instrument that utilizes representative symbols.

In another exemplary embodiment, the symbol file list may include file names and associated characteristics that corresponds to each of the plurality of stock symbols. Each of the plurality of stock symbols may relate to an abbreviation that is used to identify publicly traded shares of a stock on each of the corresponding plurality of exchanges. The plurality of stock symbols may include at least one from among a sequence of alphabetic characters, numeric characters, as well as any combination of alphabetic characters and numeric characters. In another exemplary embodiment, the symbol file list may contain file names of all symbol subsets and associated characteristics.

In another exemplary embodiment, the exemplary file list may include a text file such as, for example, an exchanges.txt file that contains a list of symbol files and associated characteristics. For example, the symbol file list may be presented as,

Mapping between NASDAQ and ARCA PILLAR symbols
../examples/NYSESymbolMapping.txt map=Y pos1=1 type1=ALPHA id1=0 pos2=2 type2=INT id2=0
Listing of ARCA PILLAR symbols
../examples/arca.txt map=N type=INT id=1
Listing of NASDAQ symbols
../examples/nasdaq.txt map=N type=ALPHA id=4.

In the above example, lines that start with a hashtag ('#') may correspond to comment lines. On non-comment lines, the first field may include the symbol file name. The second field (map=<Y|N>) may indicate whether the file contains a stock mapping (map=Y) or a stock listing (map=N). For stock mapping files, fields that follow the second field may include, pos1=<p>; type1=<ALPHA|INT>, id1=<i>; pos2=<p>; type2=<ALPHA|INT>id2=<i>, where 'pos1' indicates the column number (starting from zero) of the stock symbol.

Columns may be pipe-delineated (T) and 'type1' may indicate a symbol format such as, for example, an ALPHA or an INT (integer). 'id1' may include a byte that is used to differentiate identical symbols from different venues. The 'id1' field may be processed by using an exclusive or (XOR) gate with an unused byte of the symbols. When no unused bytes are available, the symbol input may be increased to 9 bytes (72 bits) to dedicate a separate byte for the id. When the symbol sets are unique, this field may be set to zero. 'pos2', 'type2', and 'id2' may have the same significance for the second symbol of the mapping pair. For symbol listing files, the third and fourth fields may correspond to a 'type' and an 'id', which may have the same significance as the 'type1' and 'id1' fields described above.

In another exemplary embodiment, the symbol file may include at least one from among mapping information and listing information that corresponds to each of the plurality of stock symbols. The mapping information may include information that indicates a mutual representation of a particular stock symbol. For example, the mapping information may include information indicating that two different sequences of alphanumeric characters represent a single stock symbol. In another exemplary embodiment, the mapping information may include equivalent symbols that are listed on a single line with pipe (|) delimiters. For example, the mapping information may be presented as, A|A|4541|N|N|A|100|6|59|||
AA|AA|54151|N|N|A|100|6|51|||
AAAU|AAAU|61426|N|P|B|100|6|60|||
AACG|AACG|26933|N|Q|C|100|6|63|||
AADR|AADR|35465|N|P|B|100|6|61|||
AAL|AAL|43256|N|Q|C|100|6|63|||
AAMC|AAMC|41395|N|A|B|100|6|60|||
AAME|AAME|6|N|Q|C|100|6|63|||
AAN|AAN|8968|N|N|A|100|6|52|||
AAOI|AAOI|42753|N|Q|C|100|6|64|||
AAON|AAON|8|N|Q|C|100|6|64|||
AAP|AAP|4550|N|N|A|100|6|52|||
AAPL|AAPL|HN|Q|C|100|6|63|||
AAT|AATβ6352|N|N|A|100|6|52|||
AAU|AAU|15852|N|A|B|100|6|60|||
AAWW|AAWW|16591|N|Q|C|100|6|64|||

In another exemplary embodiment, the second column in the above presentation of the mapping information may correspond to a Consolidated Quotation System (CQS) format, which may be translated to National Association of Securities Dealers Automated Quotations (NASDAQ) Integrated Platform format, and the third column may correspond to an ARCA PILLAR symbol identifier (ID) number.

In another exemplary embodiment, the listing information may correspond to a simple listing of all stock symbols. For simple listing files, the stock symbols may be listed one per line in a text format for alphabetical symbols and for numerical symbols. For example, the alphabetical listing may be represented as,

A
AA
AAAU
AACG
AADR
AAL
AAMC
AAME
AAN
AAOI
AAON
AAP
AAPL
AAT
AAU
AAWW.

In another example, the numerical listing may be presented as,
4541
54151
61426
26933
35465
43256
41395
6
8968
42753
8
4550
9
36352
15852
16591.

At step S404, a perfect hash function may be identified based on the retrieved data for the plurality of stock symbols and corresponding stock information. The perfect hash function may include a deterministic hash function that relates to a mapping of distinct elements in the corresponding stock information with the plurality of stock symbols. In an exemplary embodiment, the perfect hash function for a data set may correspond to a hash function that maps distinct elements in the data set to a set of integers without collisions. The perfect hash function may relate to an injective function where every element of a function's co-domain is the image of at most, one element of its domain. In another exemplary embodiment, the deterministic characterization indicates that the hash function generates the same hash value for a given input. As will be appreciated by a person of ordinary skill in the art, the "perfect" hash function corresponds to a type of hash function, and not merely a qualifier for the hash function.

In another exemplary embodiment, the perfect hash function may be used to implement a lookup table with constant worst-case access time. The perfect hash function may be used to implement hash tables to realize advantages. An advantage may relate to a lack of implemented resolutions that include a collision. Additionally, to save space, associated keys do not need to be stored in a lookup table when the keys do not correspond to the data and when the queries keys are known to be invalid.

In another exemplary embodiment, the disclosed invention may utilize the perfect hashing algorithm with one or multiple hash functions. Utilizing multiple hash functions may increase the probability of finding the prefect hash with a higher hash load factor. In another exemplary embodiment, hashing functions 'N' may be selected from a family of universal hashing functions. For example, the hash functions 'N' may correspond to N=3. A multiply-shift family of functions may use a form such as, $$h_a(x) = (a \cdot x \bmod 2^w) \div 2^{M-w} \quad [\text{Eq 1}]$$

where,
the 'a' coefficients are random numbers
'x' represents the symbol input
'w' is the symbol width (64 bits, but scalable), and
'M' is the number of hash bits.

The above family of hash functions has been selected because it can be implemented efficiently in hardware. The multiplication may be implemented by using Digital Signal Processing (DSP) blocks, and the mod and division operations may be implemented using shift and bit select operations.

When N=3, the three multiply-shift hash functions may be computed in parallel as follows, $$h_0(x) = H'[0] \bmod \eta$$

$$h_1(x) = H'[1] \bmod \eta + \eta$$

$$h_2(x) = H'[2] \bmod \eta + 2\eta.$$

For 'n' symbols and a hash load α, η is a number, which is a power of 2 ($2^x$) that is greater than ceiling (n/3α). For example, when n=18000 symbols

α=0.8 (80%)

ceil (n/3α)=7500, but η may be a power of 2, so η=8192.

In the next step, one of the 'N' hash values may be selected for each input symbol such that all symbols have a unique hash value (a perfect hashing). The selected hash function that generated the selected hash may be assigned an index and stored in a table. The same table may also contain an index to represent the input symbol within the set of symbols. The table now represents a minimal perfect hashing function.

At step S406, parameters that relate to an instruction to calculate the identified perfect hash function may be generated by using the retrieved data. The parameters may include at least one from among host files, simulation files, and hash state files. In an exemplary embodiment, generating the parameters may include generating the host files by using the retrieved data. The host files may include a data pair that facilitates automated programming of a register and a memory that are associated with a processing component such as, for example, a field-programmable gate array (FPGA).

In another exemplary embodiment, the host files may include at least one from among a host register file and a host direct memory access file. The host register file may include a register name together with a corresponding data pair. The host register file may contain register name/data pairs as follows, HOST_SYMBOL_HASH_CONFIG_H0_A1 0x27B23C7
HOST_SYMBOL_HASH_CONFIG_H0_A2 0x43C9869
HOST_SYMBOL_HASH_CONFIG_H0_A3 0x6334873
HOST_SYMBOL_HASH_CONFIG_H0_A4 0x4B0DC51
HOST_SYMBOL_HASH_CONFIG_H1_A1 0x2E8944B
HOST_SYMBOL_HASH_CONFIG_H1_A2 0x25558ED
HOST_SYMBOL_HASH_CONFIG_H1_A3 0x38E1F29
HOST_SYMBOL_HASH_CONFIG_H1_A4 0x6E87CCD
HOST_SYMBOL_HASH_CONFIG_H2_A1 0x07ED7AB
HOST_SYMBOL_HASH_CONFIG_H2_A2 0x6B141F3
HOST_SYMBOL_HASH_CONFIG_H2_A3 0x1B71EFB
HOST_SYMBOL_HASH_CONFIG_H2_A4 0x1E2A9E3.

These pairs may be passed to the register write function to write the data into the named register.

A memory access system file such as, for example, a host direct memory access (DMA) file may include an address together with the corresponding data pair. The host DMA file may contain address/data pairs as follows, 0xAA 0x0
0xAB 0x11C11B
0xAA 0x1
0xAB 0xDF2CF
0xAA 0x2
0xAB 0xBD151
0xAA 0x3
0xAB 0x8D727
0xAA 0x4
0xAB 0x213E
0xAA 0x5
0xAB 0x10E644
0xAA 0x6
0xAB 0xBF773
0xAA 0x7
0xAB 0x20F24B.

These pairs may be passed to the DMA register write function, which sends the file content over DMA to the FPGA. The FPGA may execute the writes to its internal memories.

In another exemplary embodiment, generating the parameters may include generating the simulation files by using the retrieved data. The simulation files may relate to instructions to preconfigure the register and the memory. The simulation files may support hardware simulations and may be equivalent to the host files described above. An example of the simulation register file may be presented as,

#########################################
#########################Symbol hash registers ###################################
##############################
HOST_SYMBOL_HASH_CONFIG_H0_A1: integer range 0 to HOSTADDRRANGE-1:=16 #152 #;
WRITE   1   000152   0   1   0   027B23C7
HOST_SYMBOL_HASH_CONFIG_H0_A2: integer range 0 to HOSTADDRRANGE-1:=16 #153 #;
WRITE   1   000153   0   1   0   043C9869
HOST_SYMBOL_HASH_CONFIG_H0_A3: integer range 0 to HOSTADDRRANGE-1:=16 #154 #;
WRITE   1   000154   0   1   0   06334873
HOST_SYMBOL_HASH_CONFIG_H0_A4: integer range 0 to HOSTADDRRANGE-1:=16 #155 #;
WRITE   1   000155   0   1   0   04B0DC51
HOST_SYMBOL_HASH_CONFIG_H1_A1: integer range 0 to HOSTADDRRANGE-1:=16 #156 #;
WRITE   1   000156   0   1   0   02E8944B
HOST_SYMBOL_HASH_CONFIG_H1_A2: integer range 0 to HOSTADDRRANGE-1:=16 #157 #;
WRITE   1   000157   0   1   0   025558ED
HOST_SYMBOL_HASH_CONFIG_H1_A3: integer range 0 to HOSTADDRRANGE-1:=16 #158 #;
WRITE   1   000158   0   1   0   038E1E29
HOST_SYMBOL_HASH_CONFIG_H1_A4: integer range 0 to HOSTADDRRANGE-1:=16 #159 #;
WRITE   1   000159   0   1   0   06E87CCD
HOST_SYMBOL_HASH_CONFIG_H2_A1: integer range 0 to HOSTADDRRANGE-1:=16 #15A #;
WRITE   1   00015A   0   1   0   007ED7AB
HOST_SYMBOL_HASH_CONFIG_H2_A2: integer range 0 to HOSTADDRRANGE-1:=16 #15B #;
WRITE   1   00015B   0   1   0   06B141F3
HOST_SYMBOL_HASH_CONFIG_H2_A3: integer range 0 to HOSTADDRRANGE-1:=16 #15C #;
WRITE   1   00015C   0   1   0   01B71EFB
HOST_SYMBOL_HASH_CONFIG_H2_A4: integer range 0 to HOSTADDRRANGE-1:=16 #15D #;
WRITE 1 00015D 0 1 1 001E2A9E.

The contents of this file may be copied into the host interface data file to configure the FPGA registers.

A sample of the three memory initialization files may be presented as,

@0000 11C11B
@0001 0DF2CF
@0002 0BD151

@0003 08D727
@0004 00213E
@0005 10E644
@0006 0BF773
@0007 20F24B
@0008 1CC829
@0009 1396B7
@000A 06B34E
@000B 01A046
@000C 0D92E3
@000D 21094C
@000E 0330D4
@000F 000000.

The contents of these files may be preloaded into the FPGA mapping memories to shorten simulation time.

In another exemplary embodiment, generating the parameters may include generating the hash state files by using the retrieved data. The hash state file may include a previously calculated parameter for the plurality of stock symbols. In another exemplary embodiment, a validation hash value may be identified for each of the plurality of stock symbols by using the perfect hash function based on the hash state files. Then, whether a collision exists between the plurality of stock symbols may be determined based on the validation hash values consistent with disclosures in the present application. The perfect hash function may be verified based on a result of the determining.

At step S408, the register and the memory that are associated with a secondary processing component may be programmed by using the parameters. In an exemplary embodiment, an equation may be implemented in hardware by using vector hashing, which takes advantage of the linearity of the equation. This technique may split a long key into smaller sub-keys, applies the hashing function to each sub-key in parallel, and then sums the results using XOR. The 64-bit symbol is split into 4, 16-bit slices and processed as follows, $$h_a(x) = \oplus_{i=1-4}(a_i \cdot x_i \bmod 2^w) \operatorname{div} 2^{w-M}$$

where,
'$\oplus$' is an Exclusive OR sum of four-bit vectors
'$a_i$' is a 27-bit coefficient calculated by software
'$x_i$' is a 16-bit slice of the 64-bit symbol
w=27 bits (width of multiplier input), and
M=13 bits (width of hash value).

For each of the three hash functions, the four multiplications may be implemented by using four DSPs, and the output of the DSPs may be added or combined. For each hashing function, the output of the XOR is used as an address into a memory (G_Map<0-2>) when the number of hashes is three (N=3). The 'G_Map' memories contain a computed 'g' array. The hash output of the three memories may be sent to a 3:1 selector (when the number of hashes is three, i.e., N=3) and controlled by the g bits, which outputs the selected hash value. Finally, the selected hash value drives the symbol table(s).

In another exemplary embodiment, programming the register and the memory may include implementing an active hashing bank and an inactive hashing bank. The inactive hashing bank may include read only permissions, and the inactive bank may include read and write permissions.

In another exemplary embodiment, implementing the active hashing bank and the inactive hashing bank may correspond to software configuration and control of hardware components. The hardware component may implement two banks of hash coefficients and mapping memories. One bank may be active (used for symbol hashing) and can be accessed by software only for reading. The other bank may be inactive and can be accessed for both reading and writing. After reset, 'bank 1' may be made active to allow software to program 'bank 0' and make 'bank 0' active before enabling client sessions. In another exemplary embodiment, enabling the client sessions may correspond to a client connection over a network to facilitate a service such as, for example, providing orders. For an intraday update, software components may program the inactive bank with new coefficients and mapping values, and initiate a bank select procedure to activate the newly programmed bank. The activation process may be executed multiple times for each intraday symbol update. Once the hardware component receives the bank select command, the hardware component may initiate the bank switch in a hitless manner (safely, between messages).

Configuring blocks may consist of programming the following control structures on the inactive bank:
1. The HOST_SYMBOL_HASH_CONFIG_H<0:2>_A<1:4> registers, where
   H<0:2> designate the three hash functions
   A<1:4> designate the four coefficients for each hash function
2. The G_Map<0:2> memories, which contain the two hash selection bits and the hash and checksum values, the checksum corresponding to a value that represents a number of bits in a transmission message.

Optionally, software components may also program the venue ID register, which is used to differentiate between venue symbol sets that may have identical alpha or numeric symbol IDs representing different instruments. This register is not duplicated.

In another exemplary embodiment, facilitating intraday updates may include initiating an intraday update on the inactive hashing bank. The intraday update may relate to an adjustment of a hash coefficient and a corresponding mapping value. Then, consistent with disclosures in the present application, the inactive hashing bank may be switched with the active hashing bank via double buffering.

At step S410, a hash value for each of a plurality of incoming stock symbols may be determined via the programmed register and the programmed memory. The hash value may relate to a symbol index that locates information corresponding to each of the plurality of incoming stock symbols. In an exemplary embodiment, a hardware component that is implemented in FPGA logic may use the parameters computed by the software component to calculate the hashing function over incoming symbols. The calculated hash value may be used as a symbol index to locate instrument-related information such as, for example, last traded price, easy-to-borrow indication, etc.

In another exemplary embodiment, the disclosed invention may be scalable in both the bit width of the symbol and the number of the symbols. In the symbol bit width scalability, the initial design may be configured to process 64-bit symbols, which covers most stock exchange protocols. The design may be scaled up to wider symbols when a protocol requires it. In addition, in some cases combining the Exchange ID with the exchange's symbol set using the XOR may cause duplicate symbols across sets. In these cases, the symbol width can be augmented with one or more bytes to hold the Exchange ID (instead of combining it by using the XOR), such that it becomes a unique prefix. For each of the additional bytes of symbol width, additional coefficients and multipliers are required for each of the N hashes ('H0', 'H1' . . . 'HN'). The outputs of the additional multipliers are XOR-combined with the outputs of the other multipliers. In addition, the functions in the software must be modified to support the additional multiplication.

In the symbol set scalability, the maximum number of symbols may be related to the size of the 'G_Map' memory, e.g., when three hash functions are used, using the following formula, $$\text{NumSymbols}=\lfloor 3\times\text{depth}(G_{Map})*\alpha \rfloor.$$

In another exemplary embodiment, the above formula may correspond to a floor function that provides the largest integer that is less than or equal to a bracketed variable. The floor function may take as input the bracketed variable and returns as output an integer that is less than or equal to the bracketed variable.

Figure 5:
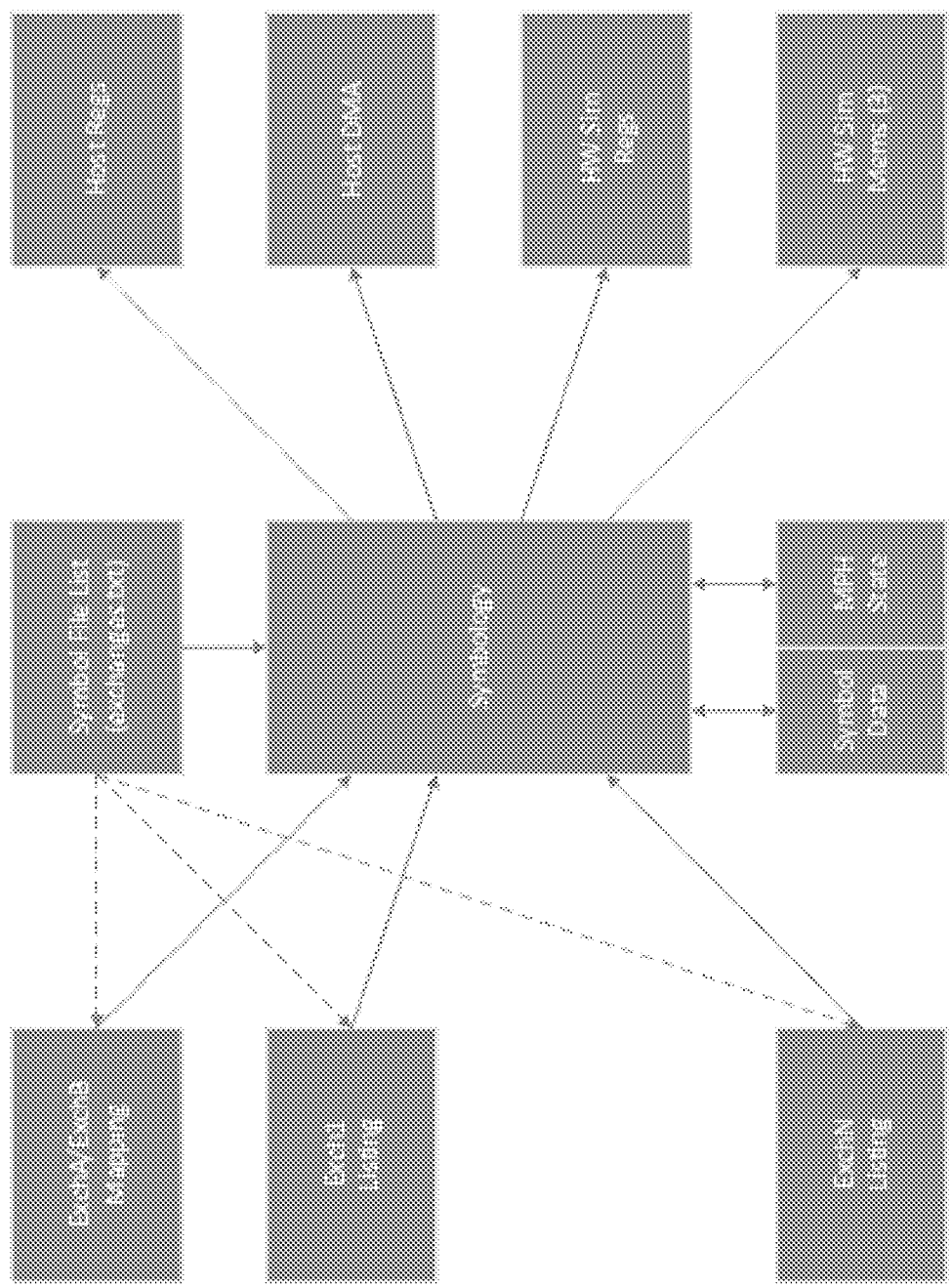
FIG. 5 is a flow diagram of an exemplary software component for implementing a method for providing high-speed storage, retrieval, and intraday updates of stock-related information for multiple exchanges.

FIG. 5 is a flow diagram 500 of an exemplary software component for implementing a method for providing high-speed storage, retrieval, and intraday updates of stock-related information for multiple exchanges. In FIG. 5, the software component may relate to standalone software instructions. The software component may preprocess a known set of symbols to find a perfect hashing function and calculates the parameters to program the hardware to calculate that hashing function. The software component may run in a generation mode and a computation mode.

In the generation mode, the software component may read the input files consistent with disclosures in the present application, compute the perfect hashing function coefficients and the contents of the mapping tables, and generate the output files described previously in the present application. In this mode, the software component may also generate the hash state file that contains the calculated hash parameters. The hash state file may be read in the computation mode to calculate the hash value of any symbol using the parameters of the previous generation run.

In the computation mode, the software component may use the previously calculated hash parameters to compute the hash values of the symbols listed in the input files described above. The symbol files may include any subset of the symbols initially used in the generation mode. The computed hash values may be outputted to the console. Note that the software component always executes the computation mode, following generation, on the full set of symbols and verifies that there are no collisions (two more symbols with the same hash value).

As illustrated in FIG. 5, the inputs to the software component may include a symbol file list that contains the file names of all symbol subsets and their associated parameters. The inputs may also include stock symbol files with mapping information and listing information. The outputs of the software component may include host register address/data to program the FPGA registers to calculate the hash values, host DMA address/data to program the FPGA memories to map between hash values and instrument data, register address/data for FPGA hardware simulation, as well as mapping memory address/data for FPGA hardware simulation. Additionally, the software component may also generate two auxiliary files. The auxiliary files may include a binary file containing all symbols to be processed, and a binary file containing the hash and mapping state information for a specific set of symbols.

Figure 6:
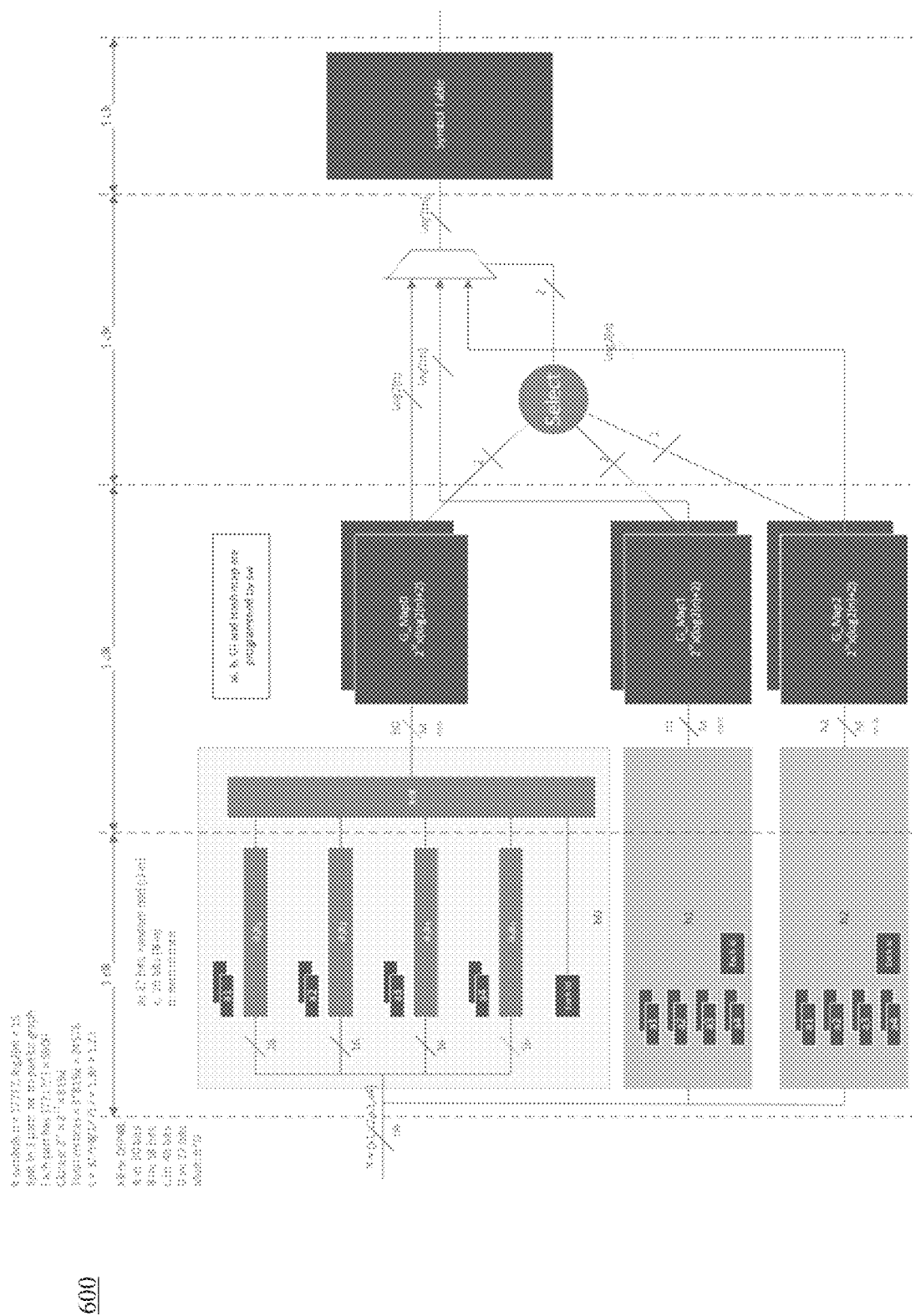
FIG. 6 is a flow diagram of an exemplary hardware component for implementing a method for providing high-speed storage, retrieval, and intraday updates of stock-related information for multiple exchanges.

FIG. 6 is a flow diagram 600 of an exemplary hardware component for implementing a method for providing high-speed storage, retrieval, and intraday updates of stock-related information for multiple exchanges. In FIG. 6, the hardware block diagram may be implemented in FPGA logic and uses the parameters computed by the software to calculate the hashing function over incoming symbols. The calculated hash value is used as a symbol index to locate instrument-related information such as, for example, last traded price, easy-to-borrow indication, etc.

As illustrated in FIG. 6, the 'aN' and 'G_MapN' blocks represent registers (a1-a4, Exch ID) and memories (G_Map<0:2>) that are programmed by the software component. The SymbolTable block represents one or more FPGA memories that hold per symbol information, e.g., last traded price, Easy-to-borrow, etc. All programmable registers and memories, except SymbolTable, are duplicated to allow in-service intraday updates.

Figure 7:
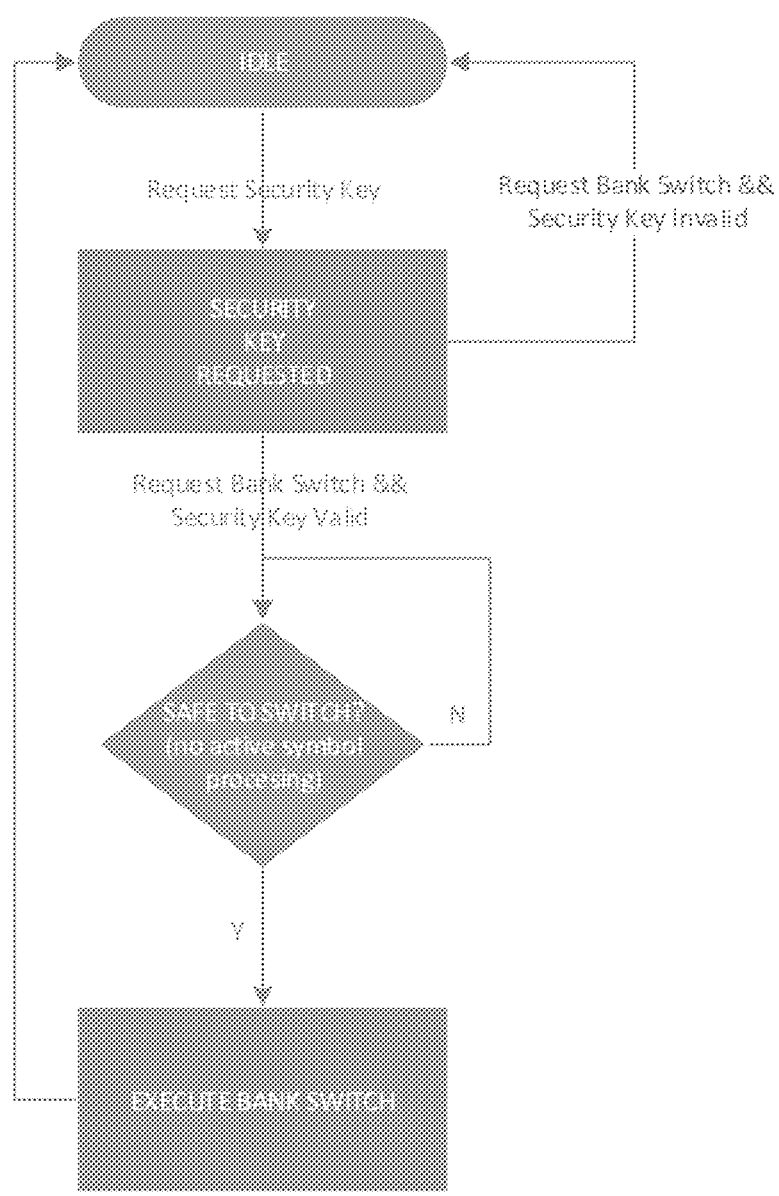
FIG. 7 is a flow diagram of an exemplary intraday update process for implementing a method for providing high-speed storage, retrieval, and intraday updates of stock-related information for multiple exchanges.

FIG. 7 is a flow diagram 700 of an exemplary intraday update process for implementing a method for providing high-speed storage, retrieval, and intraday updates of stock-related information for multiple exchanges. In FIG. 7, a state machine (SM) is used for the intraday update operation.

As illustrated in FIG. 7, the SM is normally in 'IDLE' state until a security key request is received. When a security key request is received (HOST_SYMBOL_HASH_CONFIG_CTRL bit 1), the SM transitions to the 'SECURITY KEY REQUESTED' state. The requested security key is stored in HOST_SYMBOL_HASH_CONFIG_CTRL bits 31:24.

When a bank switch is requested with the security key (HOST_SYMBOL_HASH_CONFIG_SEL bits 1 and 31:24), the SM transitions to the 'SAFE TO SWITCH?' check when the key is valid or to the 'IDLE' state when the key is incorrect.

In the 'SAFE TO SWITCH?' check, the SM executes the bank switch when a symbol is not being processed, otherwise the SM waits until the current symbol processing is completed and then executes the bank switch. Once the bank switch is executed, the SM transitions back to the 'IDLE' state.

Accordingly, with this technology, an optimized process for providing high-speed storage, retrieval, and intraday updates of stock-related information for multiple exchanges is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing high-speed storage and retrieval of information from a plurality of sources, the method being implemented by at least one processor, the method comprising:
    retrieving, by the at least one processor, data from each of the plurality of sources, the data including at least one from among a symbol file list and a symbol file;
    identifying, by the at least one processor, a perfect hash function based on the retrieved data for a plurality of stock symbols and corresponding stock information, the perfect hash function including a deterministic hash function that relates to a mapping of distinct elements in the corresponding stock information with the plurality of stock symbols;
    generating, by the at least one processor using the retrieved data, at least one parameter that relates to at least one instruction to calculate the identified perfect hash function, the at least one parameter including a host file, a simulation file, and a hash state file;
    identifying, by the at least one processor using the perfect hash function, a validation hash value for each of the plurality of stock symbols based on the hash state file;
    determining, by the at least one processor based on the validation hash value, whether a collision exists between the plurality of stock symbols;
    verifying, by the at least one processor, the perfect hash function based on a result of the determining;
    programming, by the at least one processor, at least one register and at least one memory that are associated with the at least one processor by using the at least one parameter,
        wherein the at least one register and the at least one memory are programmed based on vector hashing; and
    determining, by the at least one processor via the programmed at least one register and the programmed at least one memory, at least one hash value for each of a plurality of incoming stock symbols, the at least one hash value relating to a symbol index that locates information corresponding to each of the plurality of incoming stock symbols.

2. The method of claim 1, wherein the at least one symbol file list includes at least one file name and at least one associated characteristic that corresponds to each of the plurality of stock symbols, each of the plurality of stock symbols relating to an abbreviation that is used to identify publicly traded shares of a stock on each of the corresponding plurality of sources.

3. The method of claim 1, wherein the at least one symbol file includes at least one from among mapping information and listing information that corresponds to each of the plurality of stock symbols.

4. The method of claim 1, wherein the perfect hash function is identified for the plurality of stock symbols based on a selection of a hash function from a plurality of hash functions.

5. The method of claim 1, wherein generating the at least one parameter further comprises:
generating, by the at least one processor using the retrieved data, the host file, the host file including at least one data pair that facilitates automated programming of the at least one register and the at least one memory;
generating, by the at least one processor using the retrieved data, the simulation file, the simulation file relating to instructions to preconfigure the at least one register and the at least one memory; and
generating, by the at least one processor using the retrieved data, the hash state file, the hash state file including at least one previously calculated parameter for the plurality of stock symbols.

6. The method of claim 5, wherein the host file includes at least one from among a host register file and a host direct memory access file, the host register file including a register name together with a corresponding data pair, and the host direct memory access file including an address together with the corresponding data pair.

7. The method of claim 1, wherein programming the at least one register and the at least one memory further comprises:
implementing, by the at least one processor, an active hashing bank and an inactive hashing bank,
wherein the active hashing bank includes a read only permission, and the inactive bank includes read and write permissions.

8. The method of claim 7, further comprising:
initiating, by the at least one processor, an intraday update on the inactive hashing bank, the intraday update relating to an adjustment of a hash coefficient and a corresponding mapping value; and
switching, by the at least one processor via double buffering, the inactive hashing bank with the active hashing bank.

9. A computing device configured to implement an execution of a method for providing high-speed storage and retrieval of information from a plurality of sources, the computing device comprising:
a processor;
a memory; and
a communication interface coupled to each of the processor and the memory,
wherein the processor is configured to:
retrieve data from each of the plurality of sources, the data including at least one from among a symbol file list and a symbol file;
identify a perfect hash function based on the retrieved data for a plurality of stock symbols and corresponding stock information, the perfect hash function including a deterministic hash function that relates to a mapping of distinct elements in the corresponding stock information with the plurality of stock symbols;
generate, by using the retrieved data, at least one parameter that relates to at least one instruction to calculate the identified perfect hash function, the at least one parameter including a host file, a simulation file, and a hash state file;
identify, by using the perfect hash function, a validation hash value for each of the plurality of stock symbols based on the hash state file;
determine, based on the validation hash value, whether a collision exists between the plurality of stock symbols;
verify the perfect hash function based on a result of the determining;
program at least one register and at least one memory that are associated with the processor by using the at least one parameter,
wherein the at least one register and the at least one memory are programmed based on vector hashing; and
determine, via the programmed at least one register and the programmed at least one memory, at least one hash value for each of a plurality of incoming stock symbols, the at least one hash value relating to a symbol index that locates information corresponding to each of the plurality of incoming stock symbols.

10. The computing device of claim 9, wherein the at least one symbol file list includes at least one file name and at least one associated characteristic that corresponds to each of the plurality of stock symbols, each of the plurality of stock symbols relating to an abbreviation that is used to identify publicly traded shares of a stock on each of the corresponding plurality of sources.

11. The computing device of claim 9, wherein the at least one symbol file includes at least one from among mapping information and listing information that corresponds to each of the plurality of stock symbols.

12. The computing device of claim 9, wherein the processor is further configured to identify the perfect hash function for the plurality of stock symbols based on a selection of a hash function from a plurality of hash functions.

13. The computing device of claim 9, wherein, to generate the at least one parameter, the processor is further configured to:
generate, by using the retrieved data, the host file, the host file including at least one data pair that facilitates automated programming of the at least one register and the at least one memory;
generate, by using the retrieved data, the simulation file, the simulation file relating to instructions to preconfigure the at least one register and the at least one memory; and
generate, by using the retrieved data, the hash state file, the hash state file including at least one previously calculated parameter for the plurality of stock symbols.

14. The computing device of claim 13, wherein the host file includes at least one from among a host register file and a host direct memory access file, the host register file including a register name together with a corresponding data pair, and the host direct memory access file including an address together with the corresponding data pair.

15. The computing device of claim 9, wherein, to program the at least one register and the at least one memory, the processor is further configured to:
- implement an active hashing bank and an inactive hashing bank,
  - wherein the active hashing bank includes a read only permission, and the inactive bank includes read and write permissions.

16. The computing device of claim 15, wherein the processor is further configured to:
- initiate an intraday update on the inactive hashing bank, the intraday update relating to an adjustment of a hash coefficient and a corresponding mapping value; and
- switch, via double buffering, the inactive hashing bank with the active hashing bank.

17. A non-transitory computer readable storage medium storing instructions for providing high-speed storage and retrieval of information from a plurality of sources, the storage medium comprising executable code which, when executed by a processor, causes the processor to:
- retrieve data from each of the plurality of sources, the data including at least one from among a symbol file list and a symbol file;
- identify a perfect hash function based on the retrieved data for a plurality of stock symbols and corresponding stock information, the perfect hash function including a deterministic hash function that relates to a mapping of distinct elements in the corresponding stock information with the plurality of stock symbols;
- generate, by using the retrieved data, at least one parameter that relates to at least one instruction to calculate the identified perfect hash function, the at least one parameter including a host file, a simulation file, and a hash state file;
- identify, by using the perfect hash function, a validation hash value for each of the plurality of stock symbols based on the hash state file;
- determine, based on the validation hash value, whether a collision exists between the plurality of stock symbols;
- verify the perfect hash function based on a result of the determining;
- program at least one register and at least one memory that are associated with the processor by using the at least one parameter,
  - wherein the at least one register and the at least one memory are programmed based on vector hashing; and
- determine, via the programmed at least one register and the programmed at least one memory, at least one hash value for each of a plurality of incoming stock symbols, the at least one hash value relating to a symbol index that locates information corresponding to each of the plurality of incoming stock symbols.

18. The storage medium of claim 17, when executed by the processor, further causes the processor to identify the perfect hash function for the plurality of stock symbols based on a selection of a hash function from a plurality of hash functions.

* * * * *